US012043947B2

(12) United States Patent
Asakawa

(10) Patent No.: US 12,043,947 B2
(45) Date of Patent: Jul. 23, 2024

(54) PORTABLE WASHING KIT AND WASHING METHOD

(71) Applicant: Hush Co., Ltd., Tokyo (JP)

(72) Inventor: Fumi Asakawa, Ota-ku (JP)

(73) Assignee: Hush Co., Ltd., Tokyo (JP)

( * ) Notice: Subject to any disclaimer, the term of this patent is extended or adjusted under 35 U.S.C. 154(b) by 1001 days.

(21) Appl. No.: 16/976,246

(22) PCT Filed: Mar. 6, 2020

(86) PCT No.: PCT/JP2020/009783
§ 371 (c)(1),
(2) Date: Aug. 27, 2020

(87) PCT Pub. No.: WO2020/195723
PCT Pub. Date: Oct. 1, 2020

(65) Prior Publication Data

US 2021/0246601 A1 Aug. 12, 2021

(30) Foreign Application Priority Data

Mar. 27, 2019 (JP) ................................ 2019-061477
Oct. 30, 2019 (JP) ................................ 2019-197459

(51) Int. Cl.
*D06F 43/00* (2006.01)
*C11D 3/10* (2006.01)
(Continued)

(52) U.S. Cl.
CPC .............. *D06F 43/002* (2013.01); *C11D 3/10* (2013.01); *C11D 3/38618* (2013.01);
(Continued)

(58) Field of Classification Search
CPC ..... D06F 43/002; C11D 3/10; C11D 3/38618; C11D 3/3945; C11D 3/3951; C11D 17/041; C11D 17/04; C11D 17/08; B65D 73/0085
See application file for complete search history.

(56) References Cited

U.S. PATENT DOCUMENTS 5,320,217 A * 6/1994 Lenarz .................. B65D 83/00 206/209
2005/0059571 A1* 3/2005 Mahdessian ......... C11D 17/041 510/438
2016/0068620 A1 3/2016 Tamareselvy et al.

FOREIGN PATENT DOCUMENTS

JP H11-246898 A 9/1999
JP 2004018847 A 1/2004
(Continued)

OTHER PUBLICATIONS

International Search Report issued on Jun. 2, 2020 in corresponding International Application No. PCT/JP2020/009783; 2 pages.
(Continued)

*Primary Examiner* — Rita P Adhlakha
(74) *Attorney, Agent, or Firm* — Maier & Maier, PLLC

(57) ABSTRACT

A holder is formed of a single sheet, and includes two folding portions located at a predetermined distance in its longitudinal direction. The holder is folded in three by being divided by the two folding portions into a first holder-sheet portion, a second holder-sheet portion, and a third holder-sheet portion arranged in a stated order. A holding portion being a slit that holds a detergent packet, a rinse packet, and a support sheet is formed in the first holder-sheet portion.

14 Claims, 27 Drawing Sheets

(51) Int. Cl.

| | |
|---|---|
| ***C11D 3/386*** | (2006.01) |
| ***C11D 3/39*** | (2006.01) |
| ***C11D 3/395*** | (2006.01) |
| ***C11D 17/04*** | (2006.01) |
| *B65D 73/00* | (2006.01) |

(52) U.S. Cl.
CPC .......... *C11D 3/3945* (2013.01); *C11D 3/3951* (2013.01); *C11D 17/041* (2013.01); *B65D 73/0085* (2013.01)

(56) References Cited

FOREIGN PATENT DOCUMENTS

| | | | |
|---|---|---|---|
| JP | 2007-505234 | A | 3/2007 |
| JP | 2008081134 | A | 4/2008 |
| JP | 2017-184961 | A | 10/2017 |
| JP | 2018-104720 | A | 7/2018 |
| WO | 2005/028606 | A1 | 3/2005 |

OTHER PUBLICATIONS

Translation of the Written Opinion of the International Searching Authority issued on Jun. 2, 2020, in connection with corresponding International Application No. PCT/JP2020/009783; 8 pages.
Office Action issued on Oct. 8, 2022, in corresponding Chinese Application No. 202080001389.5, 19 pages.

* cited by examiner

| TEST OF EFFECT OF COTTON SWAB | (1) <DISSOLVING MEMBER> COTTON SWAB WITH GROOVED PATTERN AT ITS BOTH ENDS<br>(2) <RINSE MEMBER> MOISTURIZED AND STERILIZED COTTON<br>(3) <ABSORBING MEMBER> CUT COTTON SHEET (NONWOVEN) | | | | |
|---|---|---|---|---|---|
| MATERIAL OF (1) | RATING | PATTERN OF COTTON SWAB (COTTON MATERIAL g) | IMPREGNATION AMOUNT (g) | PERCENTAGE BY WHICH STAIN (MEAT SAUCE) WAS REMOVED | DETAILS |
| COMPARATIVE EXAMPLE 1 | POOR | GROOVED (0.3086) | 0.02 TO 0.05 | 20% | LIQUID CLEANER IS ABSORBED INTO COTTON OF COTTON SWAB, BUT IS NOT OOZED. (IMPREGNATION IS INSUFFICIENT.) |
| COMPARATIVE EXAMPLE 2 | POOR | GROOVED (0.3086) | 0.06 TO 0.09 | 40% | LIQUID CLEANER IS ABSORBED INTO COTTON OF COTTON SWAB, BUT IS NOT OOZED. (IMPREGNATION IS INSUFFICIENT.) |
| EXAMPLE 1 | GOOD | GROOVED (0.34 TO 0.345) | 0.1 TO 0.14 | 98% | AMOUNT OF LIQUID CLEANER IS APPROPRIATE FOR DISSOLVING STAIN OF 5 cm SQUARE. |
| COMPARATIVE EXAMPLE 3 | POOR | GROOVED (0.3428) | 0.15 TO 0.2 OR MORE | 98% | SURPLUS OF LIQUID CLEANER ABSORBED IN COTTON OF COTTON SWAB OVERFLOW UPON UNSEALING, AND OTHER PROBLEMS OCCUR (DEFECTIVE). |
| COMPARATIVE EXAMPLE 4 | POOR | GROOVED (0.3428) | 0.2 TO 0.25 | 98% | SURPLUS OF LIQUID CLEANER ABSORBED IN COTTON OF COTTON SWAB OVERFLOW UPON UNSEALING, AND OTHER PROBLEMS OCCUR (DEFECTIVE). |
| COMPARATIVE EXAMPLE 5 | POOR | STANDARD (0.352) | 0.1 TO 0.14 | 30% | LIQUID CLEANER IS EXCESSIVELY ABSORBED INTO COTTON MATERIAL, BUT IS NOT OOZED. (MATERIAL IS UNSUITED). |

FIG. 13

| MATERIAL OF (1) | | PATTERN OF COTTON SWAB (COTTON MATERIAL g) | IMPREGNATION AMOUNT (g) | PERCENTAGE BY WHICH STAIN (MEAT SAUCE) WAS REMOVED | DETAILS |
|---|---|---|---|---|---|
| COMPARATIVE EXAMPLE 6 | POOR | GROOVED (0.33) | 0.1 TO 0.14 | 98% | SURPLUS OF LIQUID CLEANER ABSORBED IN COTTON OF COTTON SWAB OVERFLOW UPON UNSEALING, AND OTHER PROBLEMS OCCUR (DEFECTIVE). |
| COMPARATIVE EXAMPLE 7 | POOR | GROOVED (0.32) | 0.1 TO 0.14 | 98% | SURPLUS OF LIQUID CLEANER ABSORBED IN COTTON OF COTTON SWAB OVERFLOW UPON UNSEALING, AND OTHER PROBLEMS OCCUR (DEFECTIVE). |
| EXAMPLE 2 | GOOD | GROOVED (0.3395) | 0.1 TO 0.14 | 98% | AMOUNT OF LIQUID CLEANER IS SUFFICIENT FOR DISSOLVING STAIN OF 5 cm SQUARE. |
| EXAMPLE 3 | GOOD | GROOVED (0.34) | 0.1 TO 0.14 | 98% | AMOUNT OF LIQUID CLEANER IS APPROPRIATE FOR DISSOLVING STAIN OF 5 cm SQUARE. |
| EXAMPLE 4 | GOOD | GROOVED (0.342) | 0.1 TO 0.14 | 98% | AMOUNT OF LIQUID CLEANER IS APPROPRIATE FOR DISSOLVING STAIN OF 5 cm SQUARE. |
| EXAMPLE 5 | GOOD | GROOVED (0.343) | 0.1 TO 0.14 | 98% | AMOUNT OF LIQUID CLEANER IS SUFFICIENT FOR DISSOLVING STAIN OF 5 cm SQUARE. |
| EXAMPLE 6 | GOOD | GROOVED (0.344) | 0.1 TO 0.14 | 98% | AMOUNT OF LIQUID CLEANER IS SUFFICIENT FOR DISSOLVING STAIN OF 5 cm SQUARE. |
| COMPARATIVE EXAMPLE 8 | POOR | GROOVED (0.36) | 0.1 TO 0.14 | 20% | LIQUID CLEANER IS ABSORBED INTO COTTON OF COTTON SWAB, BUT IS NOT OOZED. (IMPREGNATION IS INSUFFICIENT.) |
| COMPARATIVE EXAMPLE 9 | POOR | GROOVED (0.37) | 0.1 TO 0.14 | 5% | LIQUID CLEANER IS ABSORBED INTO COTTON OF COTTON SWAB, BUT IS NOT OOZED. (IMPREGNATION IS INSUFFICIENT.) |

FIG. 14

| DETAILS OF THREE MEMBERS IN KIT | | IMPREGNATION AMOUNT (g) IN [1] | IMPREGNATION AMOUNT (ml) IN [2] | | MATERIAL OF [3] | DETAILS |
|---|---|---|---|---|---|---|
| EXAMPLE 11 | GOOD | 0.1 | 8 | 98% | 7.5 cm × 7.5 cm | IN ORDER TO REMOVE STAIN WITH [2] AFTER LIQUID CLEANER IN [1] PERMEATES FABRIC ITEM, WATER IN AN AMOUNT 100 TIMES OR MORE AS LARGE AS THAT OF LIQUID CLEANER IN [1] IS NEEDED.<br><br>IN ADDITION, [3] NEEDS TO HAVE WATER ABSORBABILITY IN PROPORTION TO AMOUNT OF LIQUID IN [2]. |
| COMPARATIVE EXAMPLE 11 | POOR | 0.08 OR LESS | 10 OR LESS | 50% | CUT COTTON SHEET OF 6 cm × 8 cm | WITH REGARD TO [1], STAIN REMAINS FOR SAME REASON AS THAT OF (3).<br><br>WITH REGARD TO [2], STAIN REMAINS BECAUSE AMOUNT OF OOZING IS INSUFFICIENT. |

| MATERIAL OF [3] OF THREE MEMBERS IN KIT | | | | |
|---|---|---|---|---|
| USING CUT COTTON SHEET | | VOLUME | PERCENTAGE BY WHICH STAIN (MEAT SAUCE) WAS REMOVED | DETAILS |
| COMPARATIVE EXAMPLE 21 | POOR | 3 cm × 4 cm THICKNESS OF 0.2 cm | 40% | LIQUID IS INSUFFICIENTLY ABSORBED TO CAUSE SPREAD OF STAIN. |
| EXAMPLE 21 | GOOD | 6 cm × 8 cm THICKNESS OF 0.5 cm TO 0.8 cm | 98% | THIS SIZE IS SUFFICIENT FOR CAUSING LIQUID TO BE OOZED BY 7 ml TO 8 ml FROM [2]. COTTON SHEET IS CUT INTO RECTANGULAR SHAPE SO THAT SHEET IS EASILY APPLIED TO BACK OF CLOTHES.<br><br>WHEN VOLUME OF CUT COTTON SHEET IS LOW, LIQUID IS INSUFFICIENTLY ABSORBED TO CAUSE PROBLEMS. MEANWHILE, WHEN VOLUME IS HIGH, SHEET IS BULKY, AND HENCE IS INCONVENIENT TO CARRY. |
| COMPARATIVE EXAMPLE 22 | POOR | 3 cm × 6 cm THICKNESS OF 0.5 cm | 70% | LIQUID IS INSUFFICIENTLY ABSORBED TO CAUSE STAIN TO REMAIN. |
| COMPARATIVE EXAMPLE 23 | POOR | 10 cm × 10 cm THICKNESS OF 1 cm | 98% | SHEET IS BULKY, AND HENCE IS INCONVENIENT TO CARRY. |

FIG. 15

| COTTON SWAB ALONE | | USE | DETAILS |
|---|---|---|---|
| EXAMPLE 31 | GOOD | | LAY [3] AND THEN DISSOLVE DIRT WITH [1].<br>TRANSFER DIRT AND CLEANER TO [3] WITH WATER IN [2]. |
| COMPARATIVE EXAMPLE 31 | POOR | USE [1] ALONE | [1] ALONE ONLY DISSOLVES DIRT, AND DIRT AND CLEANER REMAIN IN TEXTILE. |
| | | SHAPE AND SIZE | |
| EXAMPLE 41 | GOOD | DISTAL END WITH DIAMTER OF 0.18 cm TO 1.5 cm | EVEN SMALL STAIN CAN BE REMOVED WITH PINPOINT ACCURACY. |
| COMPARATIVE EXAMPLE 41 | POOR | DISTAL END WITH DIAMTER OF 1.5 cm OR MORE | STAIN IS SPREAD WHEN APPLICATION AREA IS LARGE. |

FIG. 16

PORTABLE WASHING KIT AND WASHING METHOD

FIELD

The present invention relates to a detergent sheet, a rinse sheet, a portable washing kit, and a washing method for removing dirt adhering to a washing target such as clothes.

BACKGROUND

Hitherto, in case where dirt adheres to clothes or the like, for example, out of home, the dirt is removed generally by washing with use of detergent, for example, after returning home. See Japanese Patent Application Laid-open No. 2017-184961.

SUMMARY

However, in many cases, once the dirt adhering to the clothes or the like penetrates their textiles and solidifies therein over time, the dirt cannot be removed even by the washing with use of detergent thereafter, and remains as a stain.

In addition, the textiles are damaged by repeated attempts to remove the stain with use of detergent.

In such a case, when the attempt to remove the dirt is made with wet wipes in hand, a residue of the dirt remains.

Specifically, the wet wipes are formed by coating spongy pulp with synthetic resin, and hence are hardly soluble. In addition, the wet wipes are designed to wipe off the dirt under a state in which chemical liquid is retained on surfaces of the wipes (wet state).

Thus, chemical liquid is difficult to ooze therefrom, and cannot be applied to an application target by a large amount.

Although the wet wipes physically clean off the dirt, the dirt is inevitably present on their surfaces. Even after the dirt is dissolved by the chemical liquid, the residue remains on the surfaces.

The present invention has been made in view of such circumstances, and an object thereof is to provide a portable washing kit and a washing method with use of which dirt can be immediately and easily cleaned off even out of home.

Solution to Problem

A portable detergent kit according to a first aspect of the present invention includes:

- a detergent-means holding portion holding detergent means containing liquid cleaner;
- a rinse-means holding portion holding rinse means containing rinse liquid; and
- a support-means holding portion holding water-absorbing support means to be used for sandwiching, after the liquid cleaner is applied to a spot on a washing target that has got dirt on the spot, the washing target between the water-absorbing support means and the rinse means at a time when the rinse means is pressed against the dirt spot.

A washing method according to the first aspect of the present invention includes:

- a first step of pressing the detergent means of the portable detergent kit according to the first aspect against a washing target; and
- a second step of pressing, after the first step, the rinse means according to Claim 1 against the washing target,
- the second step being carried out while sandwiching the washing target between the rinse means of the portable detergent kit according to the first aspect and the water-absorbing support means of the portable detergent kit according to the first aspect.

A portable detergent kit according to a second aspect of the present invention includes:

- a detergent-sheet housing portion housing a detergent sheet;
- a rinse-sheet housing portion housing a rinse sheet; and
- a support-sheet housing portion housing a support sheet to be used for sandwiching a washing target between the support sheet and the detergent sheet or the rinse sheet at a time when the detergent sheet or the rinse sheet is pressed against a spot on the washing target that has got dirt on the spot,
- the detergent sheet being made of a water-absorbing material, and impregnated with liquid detergent,
- the liquid detergent containing
  - a bleaching detergent composition containing
    - an organic peracid precursor that reacts with hydrogen peroxide in water to produce an organic peracid having an alkyl group with 7 to 19 carbon atoms, and
    - a hydrogen-peroxide releaser,
  - a proteolytic enzyme,
  - sodium bicarbonate, and
  - water,
- the rinse sheet being made of a water-absorbing material, and impregnated with rinse liquid,
- the rinse liquid containing
  - preservative containing at least one of
    - benzalkonium chloride and
    - citric acid, and
  - water,
- the portable detergent kit being folded
  - by being folded at a folding portion located between the detergent-sheet housing portion and the rinse-sheet housing portion so that the detergent-sheet housing portion and the rinse-sheet housing portion are superimposed on each other, and
  - by being folded at another folding portion located between the rinse-sheet housing portion and the support-sheet housing portion so that the rinse-sheet housing portion and the support-sheet housing portion are superimposed on each other.

A washing method according to the second aspect of the present invention is implemented by using the portable detergent kit according to the second aspect, the washing method including:

- a first step of pressing the sheet against a washing target; and
- a second step of pressing, after the first step, the rinse sheet against the washing target while sandwiching the washing target between the rinse sheet and the support sheet.

A portable detergent kit according to a third aspect includes:

- a detergent-sheet housing portion housing a detergent sheet;
- a rinse-sheet housing portion housing a rinse sheet; and
- a support-sheet housing portion housing a support sheet to be used for sandwiching a washing target between the support sheet and the detergent sheet or the rinse sheet at a time when the detergent sheet or the rinse sheet is pressed against a spot on the washing target that has got dirt on the spot, the detergent sheet being made of a water-absorbing material, and impregnated with liquid detergent, the rinse sheet being made of a water-absorbing material, and impregnated with rinse liquid, the portable detergent kit being folded by being folded at a folding portion located between the detergent-sheet housing portion and the rinse-sheet housing portion so that the detergent-sheet housing portion and the rinse-sheet housing portion are superimposed on each other, and by being folded at another folding portion located between the rinse-sheet housing portion and the support-sheet housing portion so that the rinse-sheet housing portion and the support-sheet housing portion are superimposed on each other.

Advantageous Effects of Invention

According to the present invention, the portable cleaning kit and the washing method with use of which dirt can be immediately and easily cleaned off even out of home can be provided.

BRIEF DESCRIPTION OF DRAWINGS

FIG. 13 is one of tables showing Examples and Comparative Examples of a pattern of a cotton material, an impregnation amount of liquid cleaner, and a cleaning effect of cotton wad portions of the cotton swab according to the embodiments of the present invention.

FIG. 14 is another one of the tables showing Examples and Comparative Examples of the pattern of the cotton material, the impregnation amount of the liquid cleaner, and the cleaning effect of the cotton wad portions of the cotton swab according to the embodiments of the present invention.

FIG. 15 is a table showing attributes and cleaning effects of a rinse sheet and a support sheet according to the embodiments of the present invention.

FIG. 16 is an explanatory table showing information items about Examples of the cotton swab according to the embodiments of the present invention.

DETAILED DESCRIPTION OF EMBODIMENTS

Below, portable washing kits and washing methods according to embodiments of the present invention are described.

First Embodiment

Figure 1:
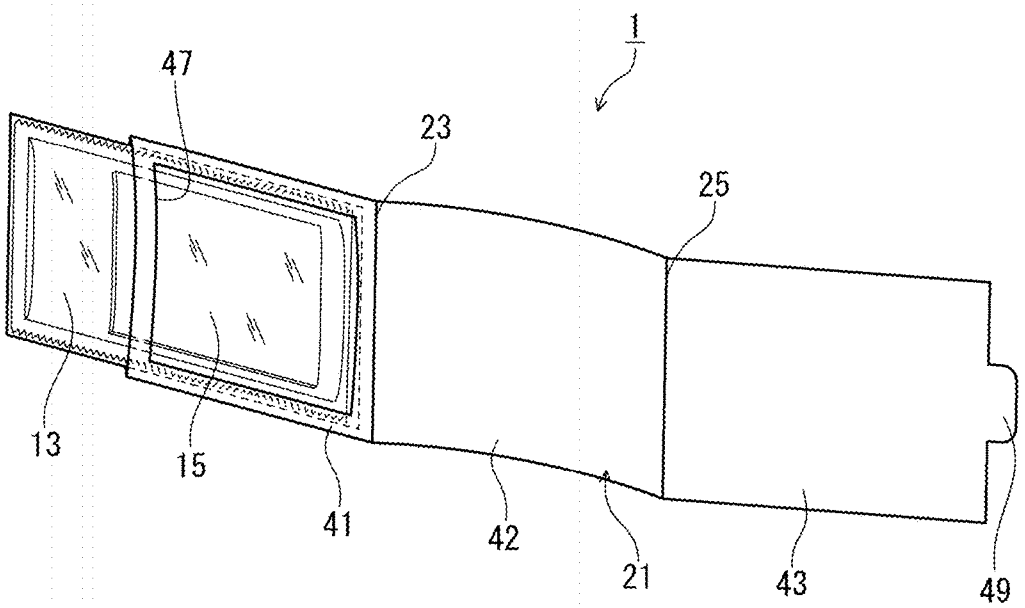
FIG. 1 is a perspective view illustrating a state in which a portable washing kit 1 according to a first embodiment of the present invention is fully developed.

FIG. 1 is a perspective view illustrating a state in which a portable washing kit 1 according to one of the embodiments of the present invention is fully developed.

Figure 2:
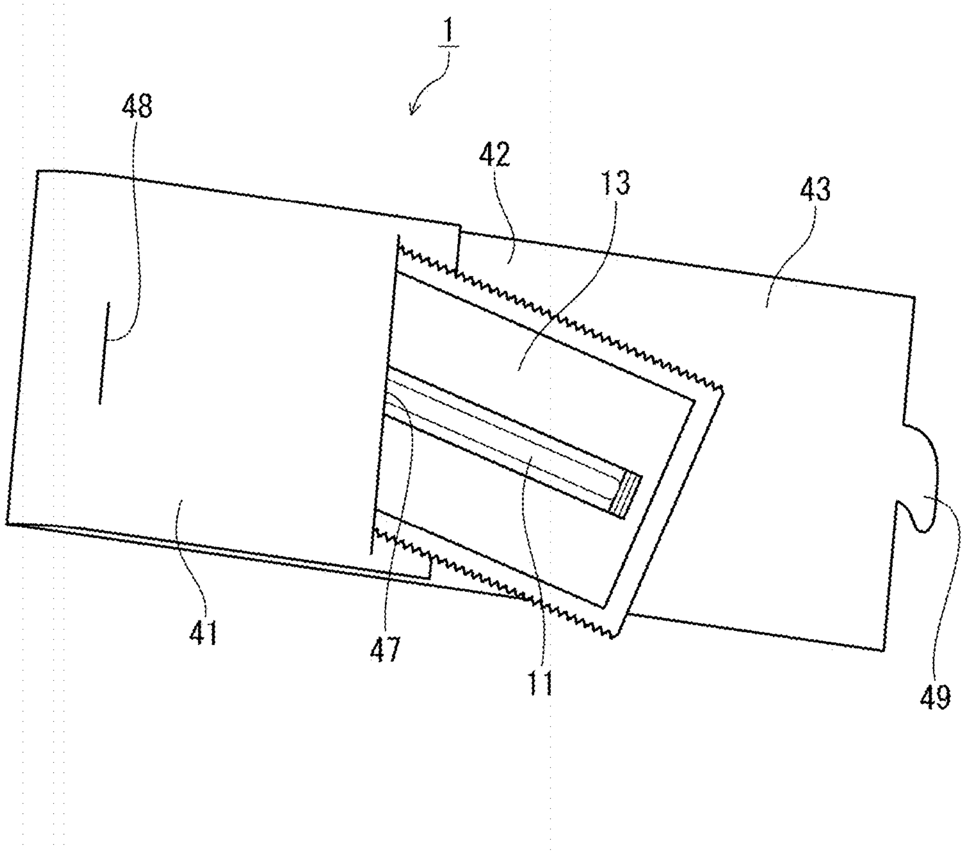
FIG. 2 is a perspective view illustrating a first open state (in use) of the portable washing kit illustrated in FIG. 1.
Figure 3:
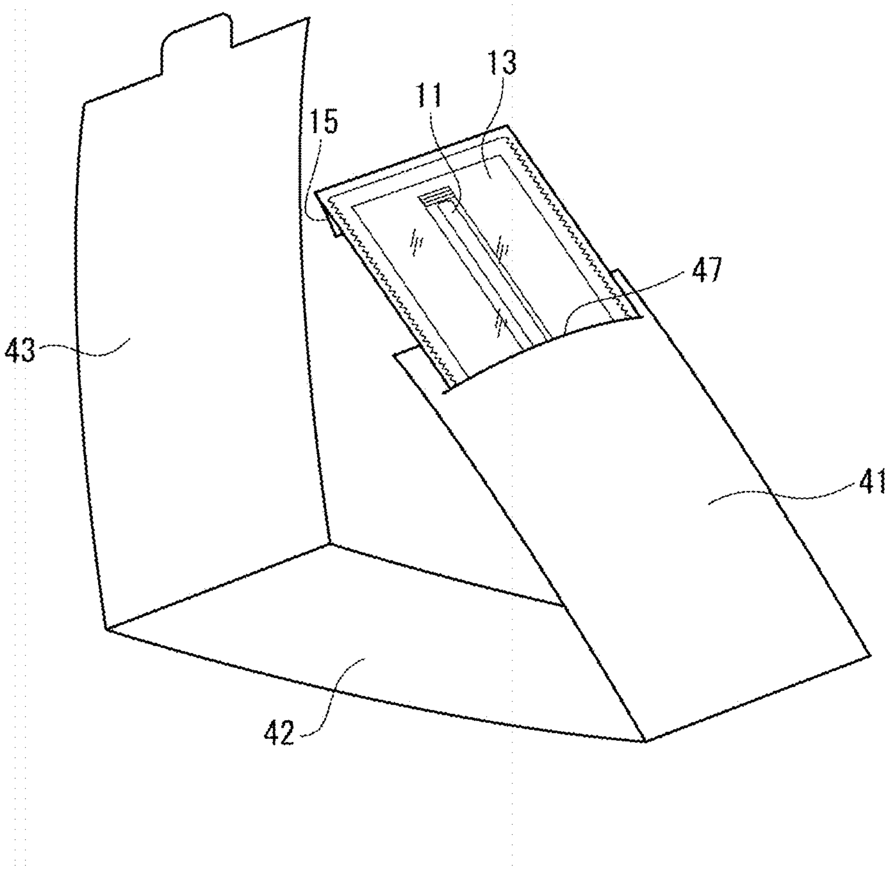
FIG. 3 is a perspective view illustrating a second open state of the portable washing kit illustrated in FIG. 1.

FIG. 2 is a perspective view illustrating a first open state (in use) of the portable washing kit 1 illustrated in FIG. 1.

As illustrated in FIG. 1, the portable washing kit 1 includes a detergent packet (detergent means) 11, a rinse packet (rinse means) 13, a support sheet (support means) 15, and a holder 21.

[Detergent Packet 11]

The detergent packet 11, which is an elongated waterproof packet, holds a cotton swab 31 impregnated with liquid cleaner. When using, a user unseals the detergent packet 11, for example, with his/her fingers, and takes out the cotton swab 31.

Figure 6:
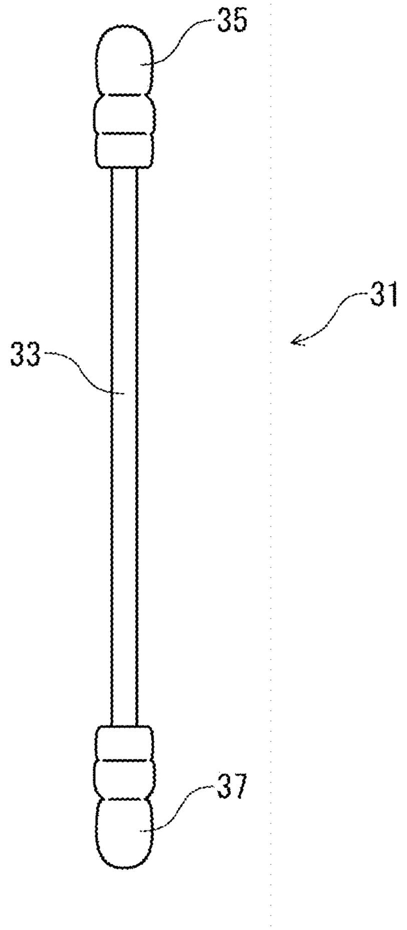
FIG. 6 is an exterior view of a cotton swab packed in a detergent packet.

As illustrated in FIG. 6, the cotton swab 31 packed in the detergent packet 11 includes cotton wad portions 35 and 37 provided at both ends of a bar member 33.

The bar member 33 is formed of a non-water-absorbing member such as plastic or a metal. With this, the liquid cleaner can be prevented from permeating the bar member 33.

The cotton wad portions 35 and 37 are impregnated with the liquid cleaner.

The cotton wad portions 35 and 37 are formed of fibers, and are capable of causing capillary action to retain and ooze the liquid cleaner, thereby applying the liquid cleaner to a washing target.

The cotton wad portions 35 and 37 are each, for example, of a grooved type.

Details of the cotton wad portions 35 and 37 and the liquid cleaner being impregnant therein are described below.

The detergent packet 11 is formed, for example, of an aluminum film.

The liquid cleaner to be used contains, as its components, a bleaching detergent composition containing an organic peracid precursor that reacts with hydrogen peroxide in water to produce an organic peracid having an alkyl group with 7 to 19 carbon atoms and a hydrogen-peroxide releaser, a proteolytic enzyme, sodium bicarbonate, and water.

[Rinse Packet 13]

The rinse packet 13 is waterproof, and holds a rectangular rinse sheet therein. When using, a user unseals the rinse packet 13, for example, with his/her fingers, and takes out the rinse sheet.

This rinse sheet is made of a water-absorbing material such as fibers of cotton or the like, and is capable of causing the capillary action to retain and ooze the liquid cleaner, thereby applying rinse liquid to the washing target.

The rinse sheet has a three-layer structure including a cotton layer 23, a cotton PET layer 25, and another cotton layer 27.

The rinse sheet is impregnated with the rinse liquid. The rinse liquid to be used contains, as its components, for example, preservative containing at least one of benzazirconium chloride and citric acid, and water.

An amount of the impregnation of the rinse sheet with the rinse liquid is, for example, 8 ml to 12 ml.

[Support Sheet 15]

The support sheet 15 is a water-absorbing sheet to be used for sandwiching, after the liquid cleaner is applied from the cotton swab 31 to a spot on the washing target that has got dirt on the spot, the washing target between the support sheet 15 and the rinse sheet at a time when the rinse sheet is pressed against the dirt spot.

The support sheet 15 is made, for example, of pulp.

The support sheet 15 is packed, for example, in a transparent waterproof packet.

[Holder 21]

The holder 21 is formed, for example, of a single sheet, and includes two folding portions 23 and 25 located at a predetermined distance in its longitudinal direction. The holder 21 is folded in three by being divided by the folding portions 23 and 25 into a first holder-sheet portion 41, a second holder-sheet portion 42, and a third holder-sheet portion 43 arranged in the stated order.

A holding portion 47 that holds the detergent packet 11, the rinse packet 13, and the support sheet 15 is formed in the first holder-sheet portion 41.

The holding portion 47 is a slit that allows the detergent packet 11, the rinse packet 13, and the support sheet 15 to be inserted therethrough and holds them.

The detergent packet 11, the rinse packet 13, and the support sheet 15 are held while being superimposed on each other in the holding portion 47.

In this state, the detergent packet 11, the rinse packet 13, and the support sheet 15 that are held while being superimposed on each other are arranged in an order of the support sheet 15, the rinse packet 13, and the detergent packet 11 from a depth side toward a near side.

Figure 4:
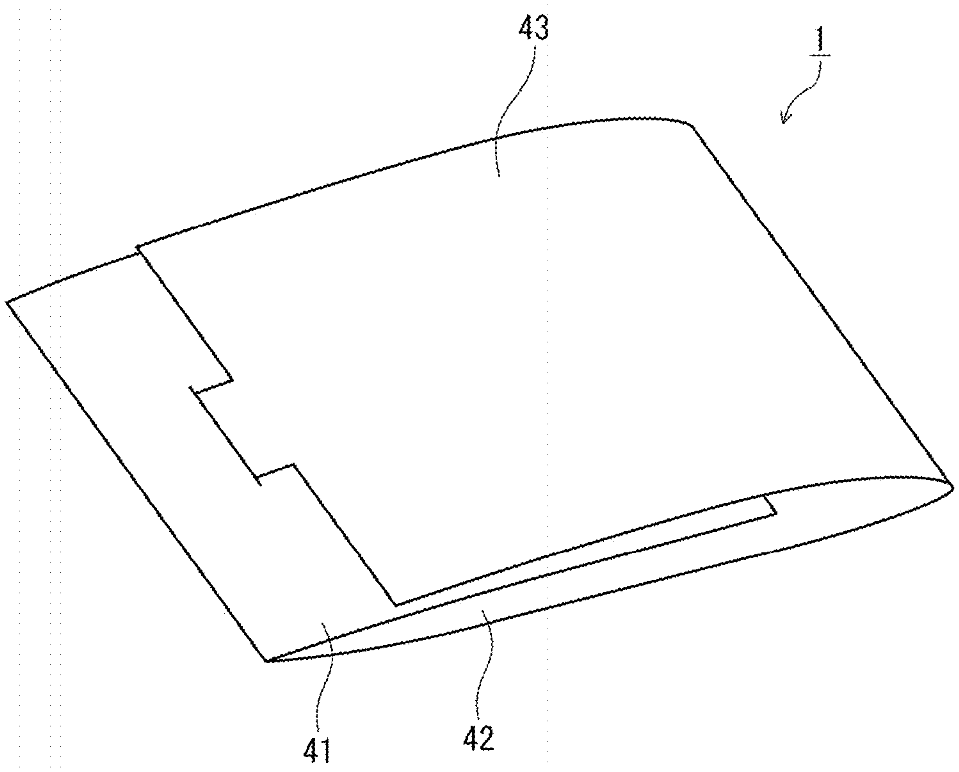
FIG. 4 is a perspective view illustrating a closed state (while being carried) of the portable washing kit illustrated in FIG. 1.
Figure 5:
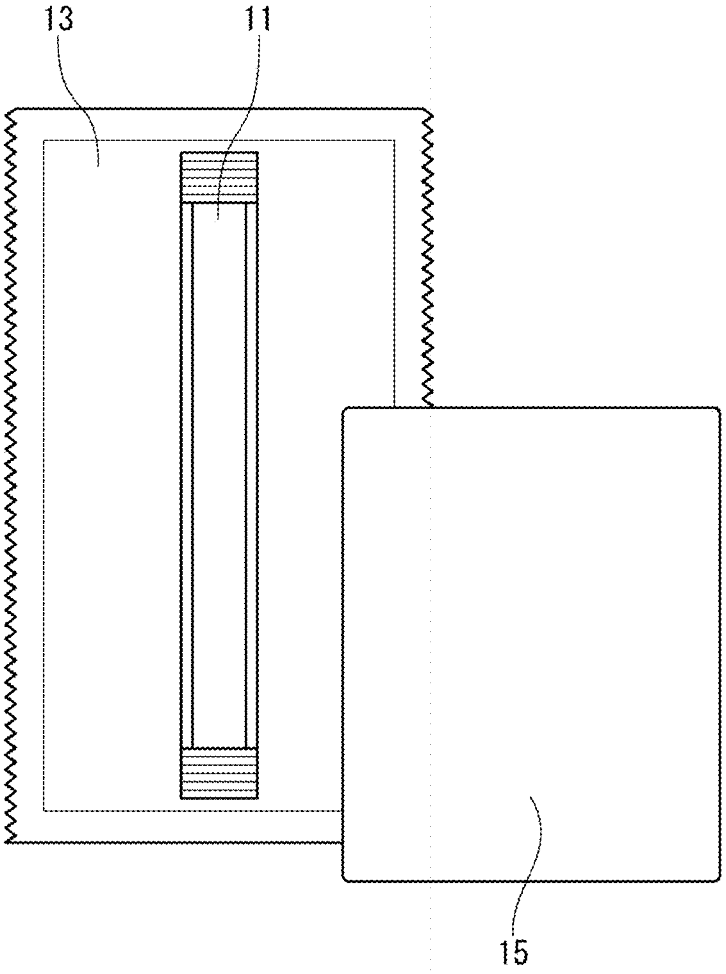
FIG. 5 is an explanatory view illustrating contents to be held in the portable washing kit.

As illustrated in FIG. 4, in a closed state before the use of the portable washing kit 1, the holder 21 is folded at the folding portions 23 and 25 so that entireties of the detergent packet 11, the rinse packet 13, and the support sheet 15 held by the holding portion 47 are not exposed to an outside, and so that the first holder-sheet portion 41, the second holder-sheet portion 42, and the third holder-sheet portion 43 are superimposed on each other.

At this time, as illustrated in FIG. 4, a protruding portion 49 of the third housing-sheet portion 43 is fixed by being inserted into a slit 48 of the first housing-sheet portion 41, which is illustrated in FIG. 2.

Further, in the closed state illustrated in FIG. 4, parts of the detergent packet 11, the rinse packet 13, and the support sheet 15 are located at positions sandwiched between the first holder-sheet portion 41 and the second holder-sheet portion 42.

Meanwhile, other parts of the detergent packet 11, the rinse packet 13, and the support sheet 15 are located at positions sandwiched between the second holder-sheet portion 42 and the third holder-sheet portion 43.

[Washing Method]

Below, a use method (washing method) for the portable washing kit 1 is described.

The portable washing kit 1 is suited to removing a stain of approximately 5 cm square on clothes, for example, out of home.

In case where dirt (stain) adheres to the washing target, the user brings the portable washing kit 1 into the open state, and takes out and unseals the detergent packet 11, thereby taking out the cotton swab 31 therefrom.

Then, the user presses the cotton wad portions 35 and 37 of the cotton swab 31 against a spot on the washing target that has got the dirt on the spot.

In this way, the dirt on the washing target becomes dirt that is hydrolyzed by the liquid cleaner being the impregnant in the cotton wad portions 35 and 37 and trapped by the liquid cleaner.

Next, the user takes out the rinse packet 13 and the support sheet 15 from the portable washing kit 1. After that, the user unseals the rinse packet 13, and takes out the rinse sheet therefrom.

Then, the user sandwiches the washing target between the rinse sheet and the support sheet 15, and presses the rinse sheet against the washing target.

In this way, the rinse liquid is oozed from the rinse sheet into the washing target, and the liquid cleaner trapping the dirt is mixed into the rinse liquid.

Then, the rinse liquid in which the liquid cleaner trapping the dirt has been mixed is absorbed into the support sheet 15. By repeating this operation, substantially all the rinse liquid is absorbed into the support sheet 15.

As described above, in the portable washing kit 1, the holder 21 accommodates the detergent packet 11, the rinse packet 13, and the support sheet 15 in its portable size. Thus, the user can easily clean off the dirt adhering to the clothes or the like out of home.

Further, by using the portable washing kit 1, specifically, by pressing the cotton wad portions 35 and 37 of the cotton swab 31 packed in the detergent packet 11 against the dirt spot, the liquid cleaner being the impregnant in the cotton wad portions 35 and 37 can be applied only to the dirt spot. With this, the stain of approximately 5 cm square on the clothes can be effectively cleaned off.

Still further, as illustrated, for example, in FIG. 2, the support sheet 15, the rinse packet 13, and the detergent packet 11 are held while being superimposed on each other in the stated order from the depth side toward the near side. With this, the detergent packet 11 to be used first can be easily and conveniently taken out first. In addition, use in wrong orders can be prevented.

Yet further, by selecting the liquid cleaner and the risk liquid as described above, an effect of dissolving and washing off the dirt can be increased.

Second Embodiment

Figure 7:
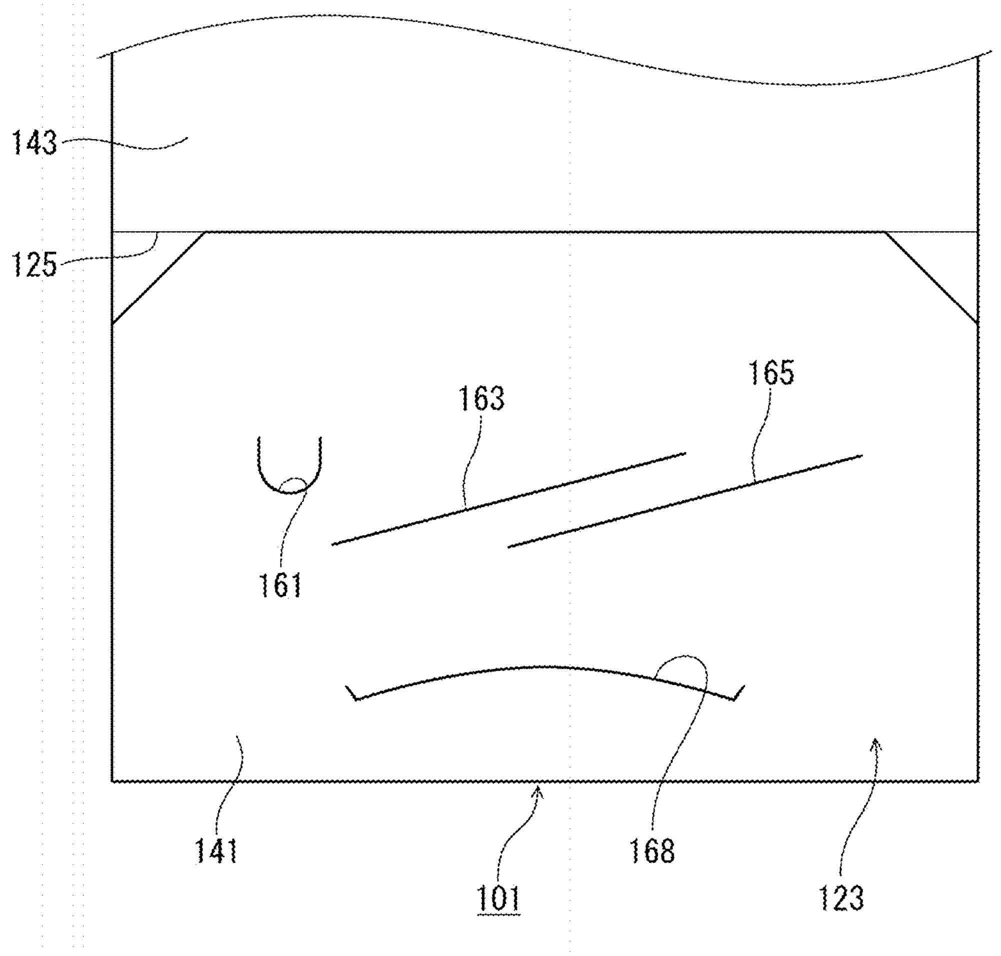
FIG. 7 is an explanatory view illustrating a state in which contents have not been housed in an open state of a portable washing kit according to a second embodiment of the present invention.
Figure 8:
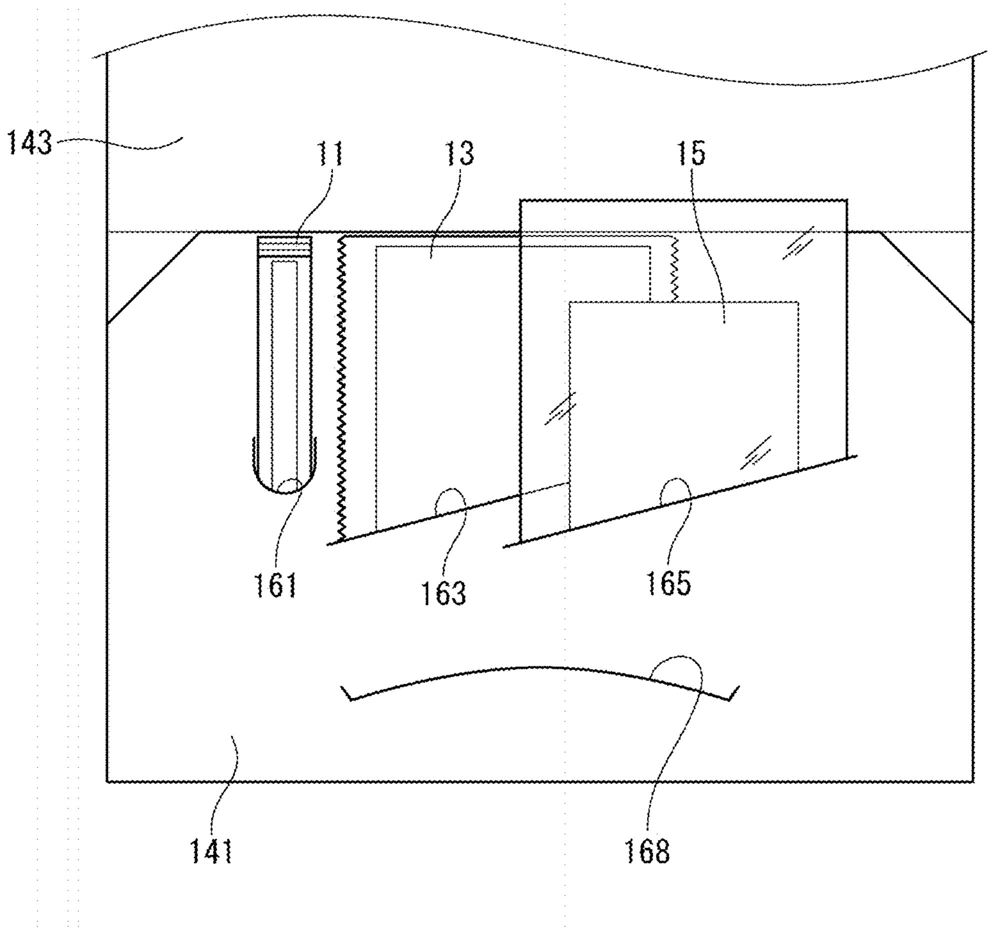
FIG. 8 is an explanatory view illustrating a state in which the contents have been housed.
Figure 9:
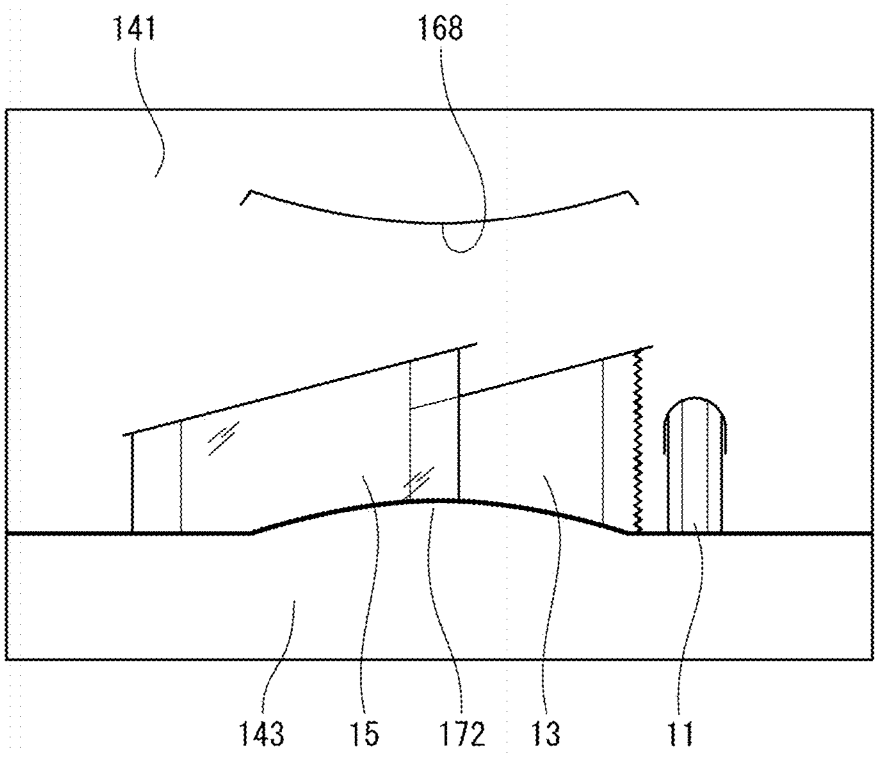
FIG. 9 is an explanatory view illustrating how the portable washing kit illustrated in FIG. 7 is opened and closed.
Figure 10:
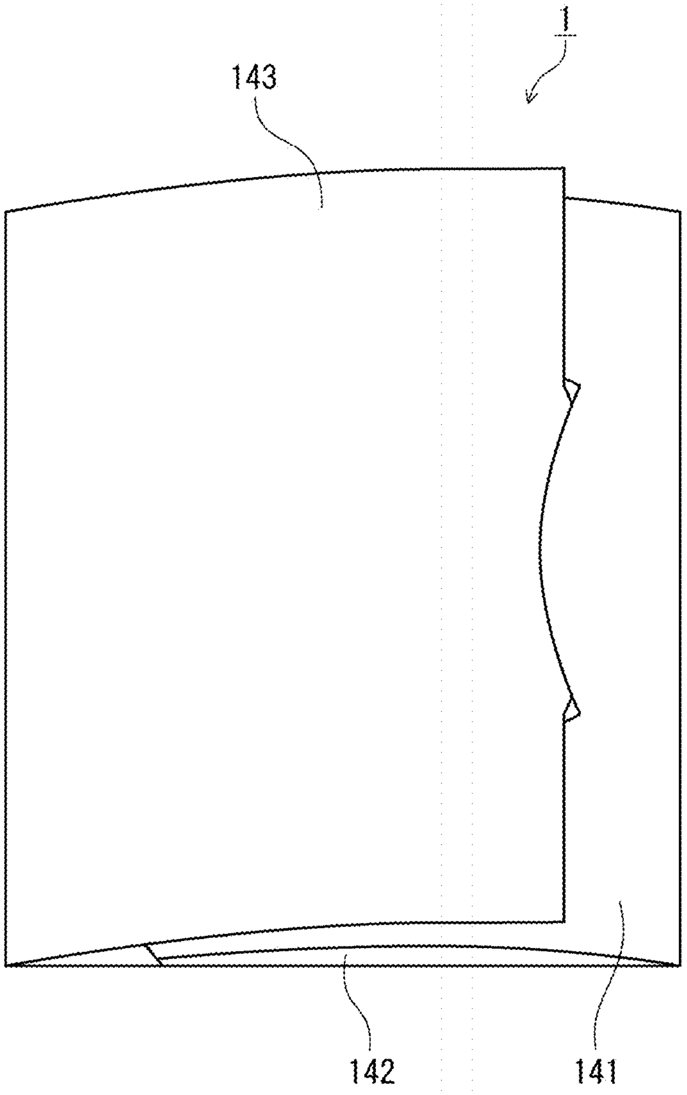
FIG. 10 is a side view illustrating a closed state of the portable washing kit illustrated in FIG. 7.
Figure 11:
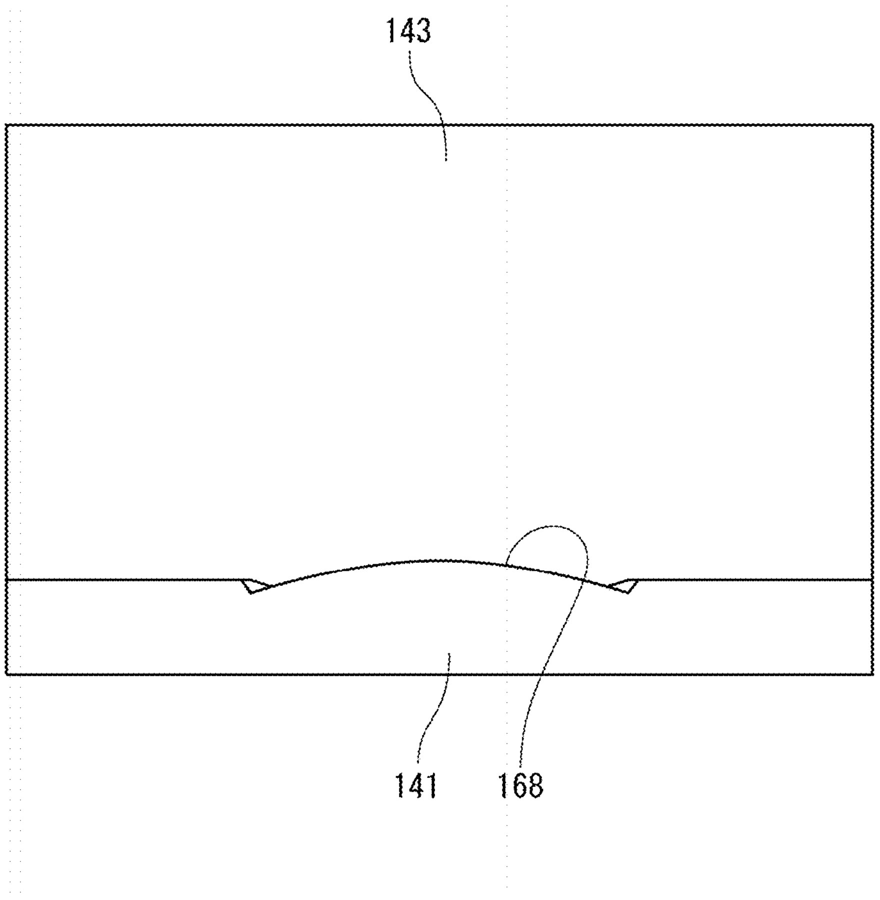
FIG. 11 is a front view illustrating the closed state of the portable washing kit illustrated in FIG. 7.

FIG. 7 is an explanatory view illustrating a state in which contents have not been housed in an open state of a portable washing kit 101 according to a second embodiment of the present invention. FIG. 8 is an explanatory view illustrating a state in which the contents have been housed in FIG. 7.

The portable washing kit 101 includes the detergent packet 11, the rinse packet 13, the support sheet 15, and a holder 121.

The detergent packet 11, the rinse packet 13, and the support sheet 15 are, for example, the same as those described in the first embodiment.

The holder 121 is described.

The holder 121 is a holder sheet that is folded in three by being divided by two folding portions 123 and 125 into a first holder-sheet portion 141, a second holder-sheet portion 142, and a third holder-sheet portion 143 arranged in the stated order.

As illustrated in FIG. 7, in the first holder-sheet portion 141, a detergent-means holding portion 161, a rinse-means holding portion 163, and a support-means holding portion 165 are respectively formed as slits in the stated order from the left to the right in FIG. 7.

As illustrated in FIG. 8, the detergent packet 11 is held in the detergent-means holding portion 161 of the first holder-sheet portion 141. The rinse packet 13 is held in the rinse-means holding portion 163. The support sheet 15 is held in the support-means holding portion 165.

In a closed state of the portable washing kit 101, parts of the detergent packet 11, the rinse packet 13, and the support sheet 15 are located at positions sandwiched between the first holder-sheet portion 141 and the second holder-sheet portion 142. Meanwhile, other parts of the detergent packet 11, the rinse packet 13, and the support sheet 15 are located at positions sandwiched between the first holder-sheet portion 141 and the third holder-sheet portion 143.

As illustrated in FIG. 8, the support sheet 15 is held in the support-means holding portion 165 so that the support sheet 15 and the rinse packet 13 held in the second holder-sheet portion 142 partially overlap with each other, and so that the support sheet 15 is located before the rinse packet 13.

In the closed state of the portable detergent kit 101, a protruding portion 172 of the third holder-sheet portion 143 is fixed by being inserted into a slit 168 formed in the first holder-sheet portion 141.

This embodiment also provides advantages similar to those of the first embodiment.

The present invention is not limited to the above-described embodiments.

Specifically, the shapes, etc. of the detergent packet 11, the rinse sheet 21, and the support sheet 31 are not limited to those in the above-described embodiments, and may be changed as appropriate.

Further, a method of housing the detergent packet, the rinse packet, and the support sheet in each of the portable washing kits may be changed as appropriate.

Still further, the linear means need not necessarily be the cotton swab, and may be, for example, a sheet.

Yet further, the portable washing kits may each hold only the detergent packet and the rinse packet without holding the support sheet.

Figure 12:
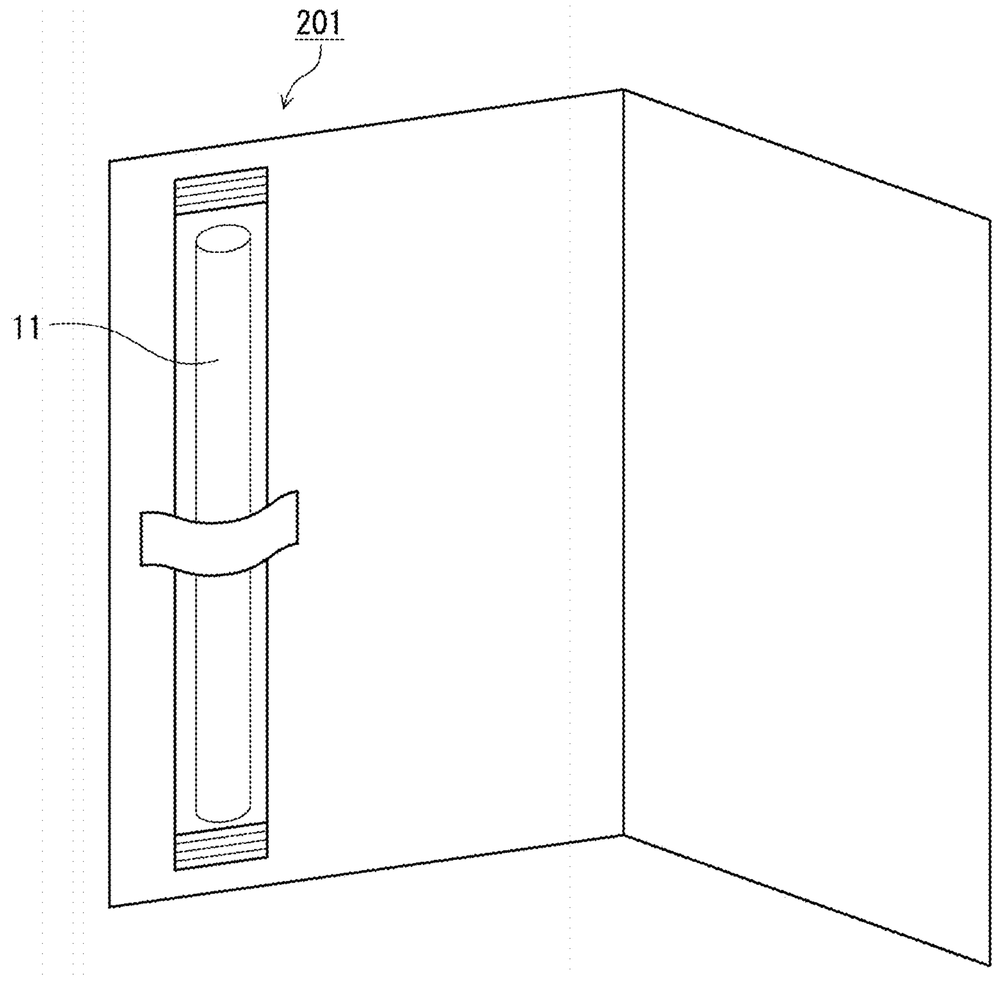
FIG. 12 is an explanatory view illustrating a portable washing kit according to another embodiment of the present invention.

Yet further, as illustrated in FIG. 12, a portable washing kit 201 that holds only the detergent packet 11 may be employed.

Below, a cotton material of the cotton wad portions 35 and 37 of the cotton swab 31 is described.

FIG. 13 and FIG. 14 are tables showing Examples and Comparative Examples of a pattern of the cotton material, an impregnation amount of the liquid cleaner, and a cleaning effect of the cotton wad portions 35 and 37 of the cotton swab 31 according to the embodiments of the present invention.

The <PATTERN OF COTTON SWAB> corresponds to the cotton wad portions 35 and 37 of the cotton swab 31, the <RINSE MEMBER> corresponds to the rinse sheet, and the <ABSORBING MEMBER> corresponds to the support sheet 15.

It is understood that the cleaning effects are especially greater in Examples in which the "COTTON MATERIAL (g)" of the grooved cotton-wad portions 35 and 37 ranges from 0.34 to 0.345, and in which the "IMPREGNATION AMOUNT (g)" of the liquid cleaner ranges from 0.1 to 0.14 than in Comparative Examples.

Combinations in these Examples are suited to dissolving the stain of 5 $cm^2$.

FIG. 15 is a table showing attributes and cleaning effects of the rinse sheet and the support sheet 15 according to the embodiments of the present invention.

As shown in FIG. 15, the amount of impregnation (ml) of the rinse sheet with the rinse liquid is preferably 8 ml relative to the liquid cleaner of 0.1 g. In addition, the support sheet 15 is preferably a cut cotton sheet of 7.5 cm×7.5 cm.

FIG. 16 shows information items about Examples of the cotton swab 31 according to the embodiments of the present invention.

The cotton wad portions 35 and 37 of the cotton swab 31 each preferably have a washing diameter of 0.18 cm to 1.5 cm.

Third Embodiment

[Detergent Sheet 311]

Figure 17:
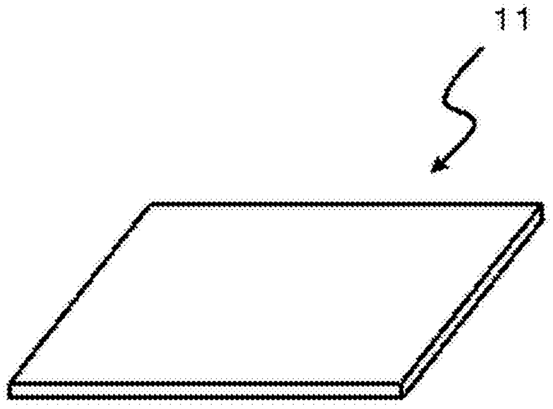
FIG. 17 is an exterior view of a detergent sheet according to a third embodiment of the present invention.

FIG. 17 is an exterior view of a detergent sheet 311 according to a third embodiment of the present invention.

As illustrated in FIG. 17, the detergent sheet 311 is made of a water-absorbing material, and is formed, for example, into a rectangular sheet-like shape.

The detergent sheet 311 is impregnated with liquid detergent.

The detergent sheet 311 is formed of the fibers of cotton or the like, and is capable of causing the capillary action to retain and ooze the liquid detergent, thereby applying the liquid detergent to the washing target.

The liquid cleaner to be used contains, as its components, the bleaching detergent composition containing the organic peracid precursor that reacts with the hydrogen peroxide in water to produce the organic peracid having the alkyl group with 7 to 19 carbon atoms and the hydrogen-peroxide releaser, the proteolytic enzyme, the sodium bicarbonate, and water.

[Rinse Sheet 321]

Figure 18:
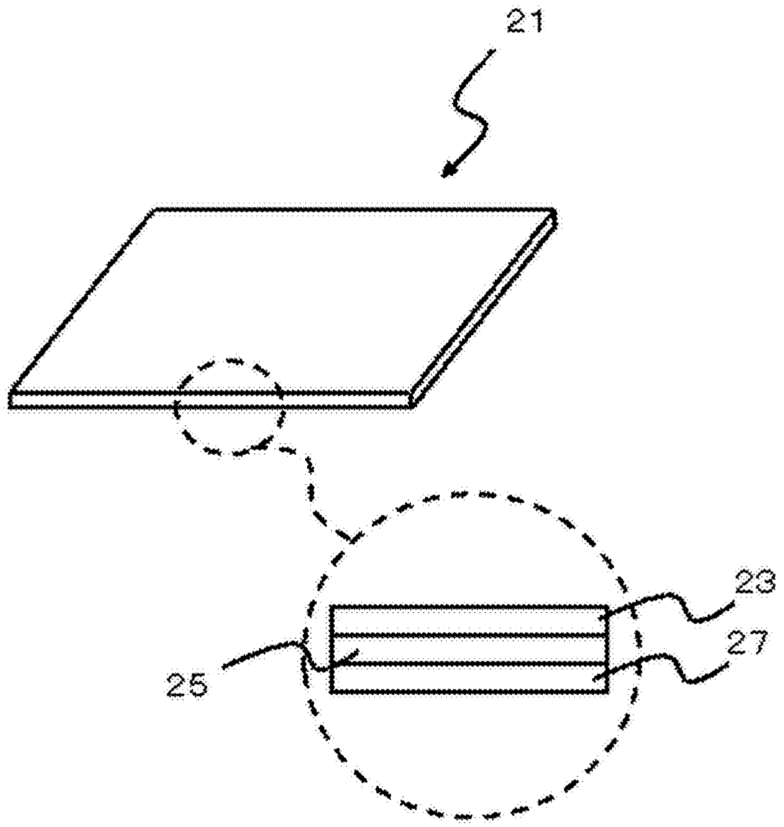
FIG. 18 is an exterior view of a rinse sheet according to the third embodiment of the present invention.

FIG. 18 is an exterior view of a rinse sheet 321 according to the embodiment of the present invention.

As illustrated in FIG. 18, the rinse sheet 321 is formed, for example, into the rectangular sheet-like shape.

The detergent sheet 311 is made of the water-absorbing material such as the fibers of cotton or the like, and is capable of causing the capillary action to retain and ooze the liquid detergent, thereby applying the rinse liquid to the washing target.

As illustrated in FIG. 18, the rinse sheet 321 has the three-layer structure including the cotton layer 23, the cotton PET layer 25, and the other cotton layer 27.

[Support Sheet 331]

Figure 19:
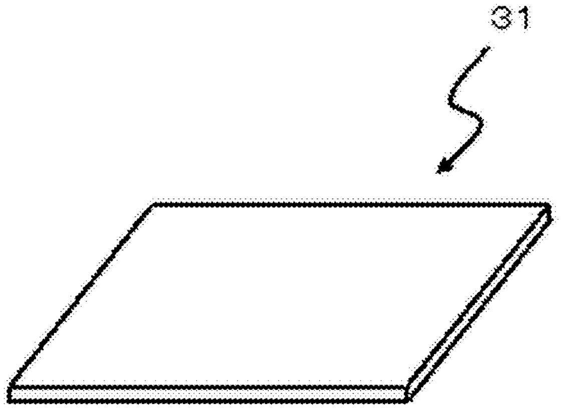
FIG. 19 is an exterior view of a support sheet according to the third embodiment of the present invention.

FIG. 19 is an exterior view of a support sheet 331 according to the embodiment of the present invention.

As illustrated in FIG. 19, the support sheet 331 is formed, for example, into the rectangular sheet-like shape.

The support sheet 331 is made of pulp.

[Washing Method]

Below, a washing method that is implemented by using the detergent sheet 311, the rinse sheet 321, and the support sheet 331 is described.

Figure 20:
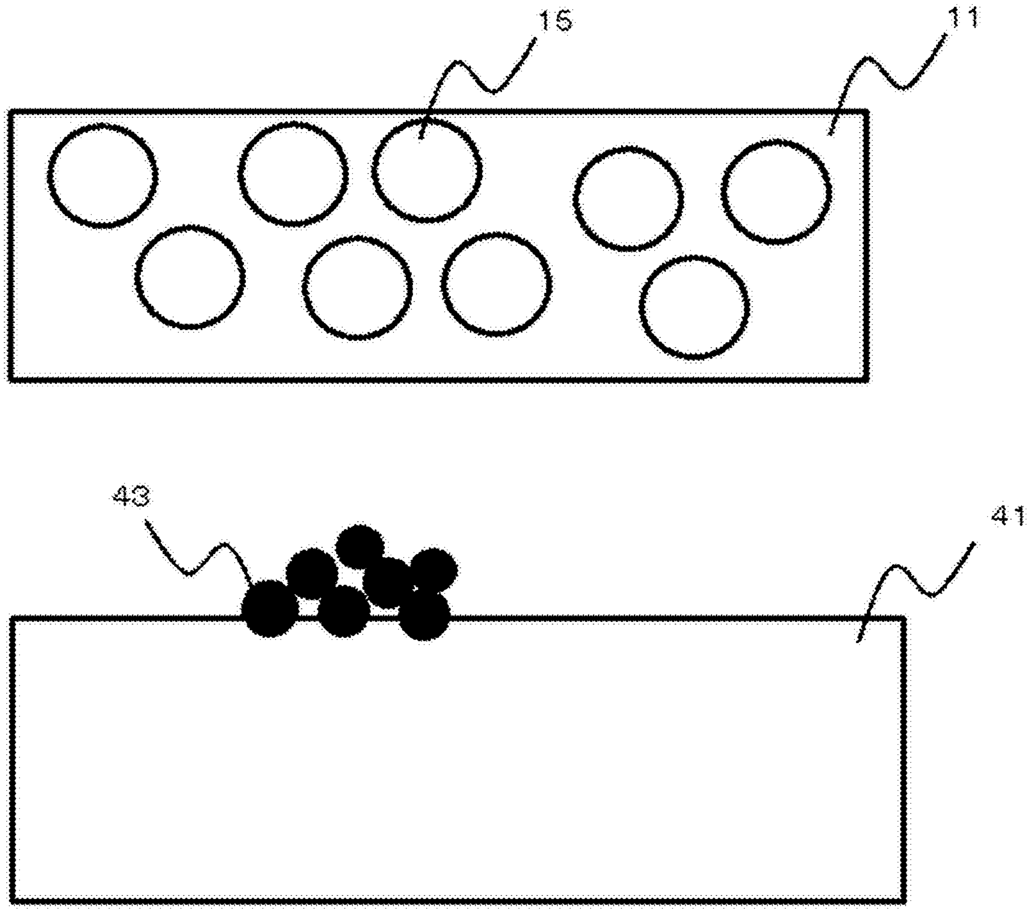
FIG. 20 is an explanatory view illustrating a washing method according to the third embodiment of the present invention.
Figure 21:
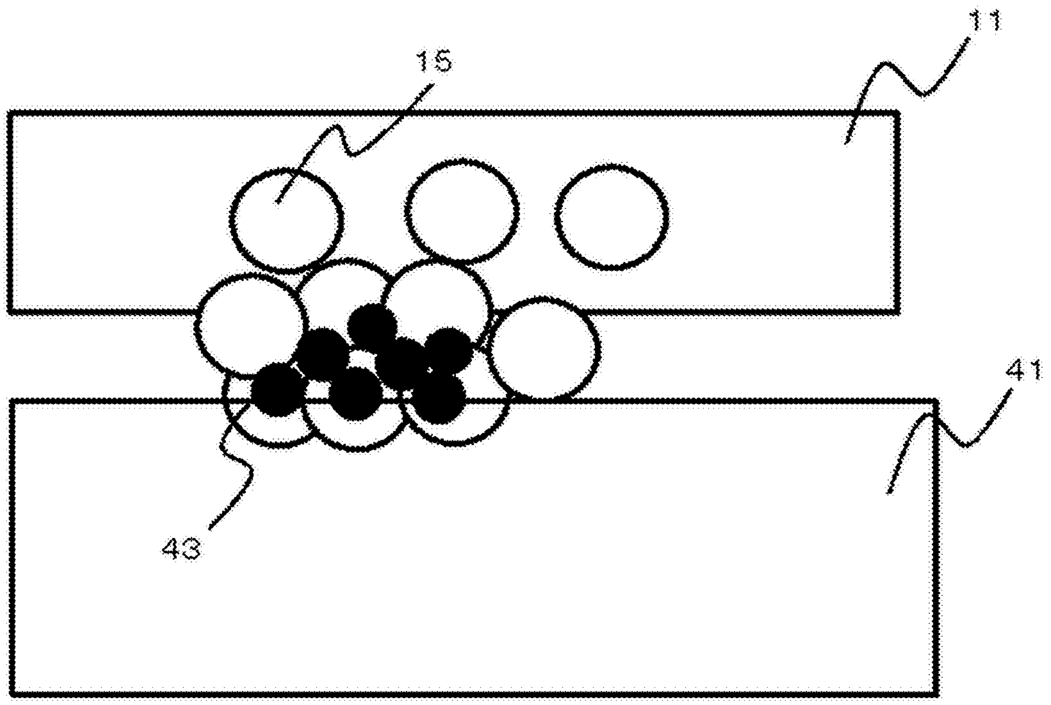
FIG. 21 is a view subsequent to FIG. 20.
Figure 22:
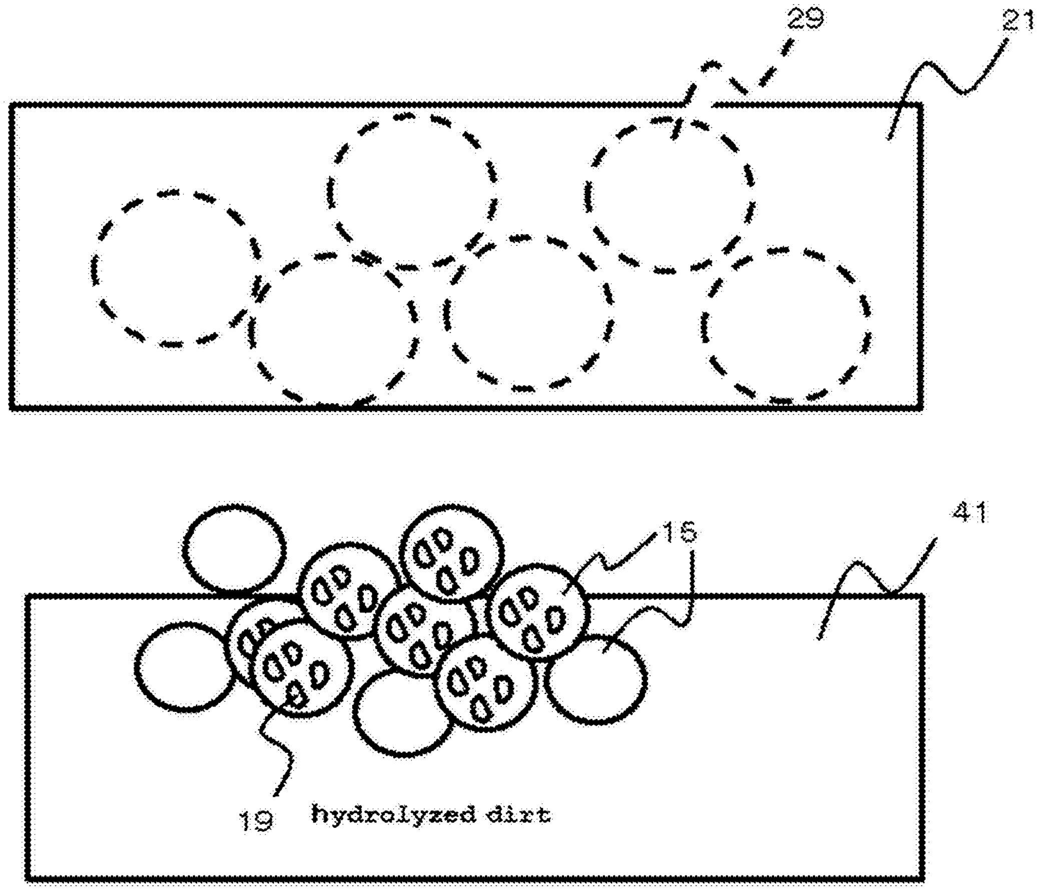
FIG. 22 is a view subsequent to FIG. 21.

FIG. 20 to FIG. 22 are explanatory views illustrating the washing method according to the embodiment of the present invention.

As illustrated in FIG. 20, in case where dirt (stain) 343 adheres to a washing target 341, the user takes out the detergent sheet 311 impregnated with liquid detergent 15.

Then, as illustrated in FIG. 21, the user presses the detergent sheet 311 against a spot on the washing target 341 that has got the dirt 343 on the spot.

With this, as illustrated in FIG. 22, the dirt 343 on the washing target 341 then becomes dirt 319 that is hydrolyzed by the liquid detergent 15 and trapped in the liquid detergent 315.

Figure 23:
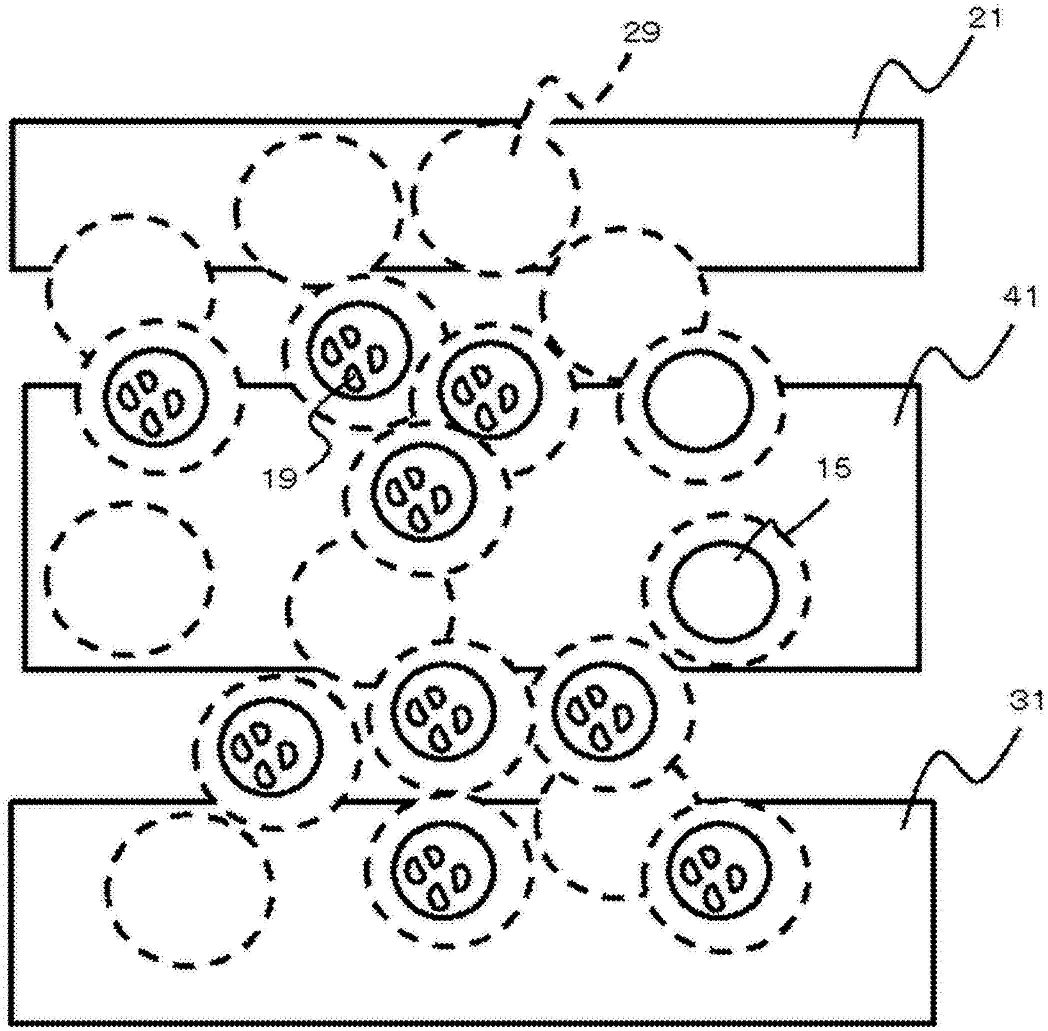
FIG. 23 is a view subsequent to FIG. 22.
Figure 24:
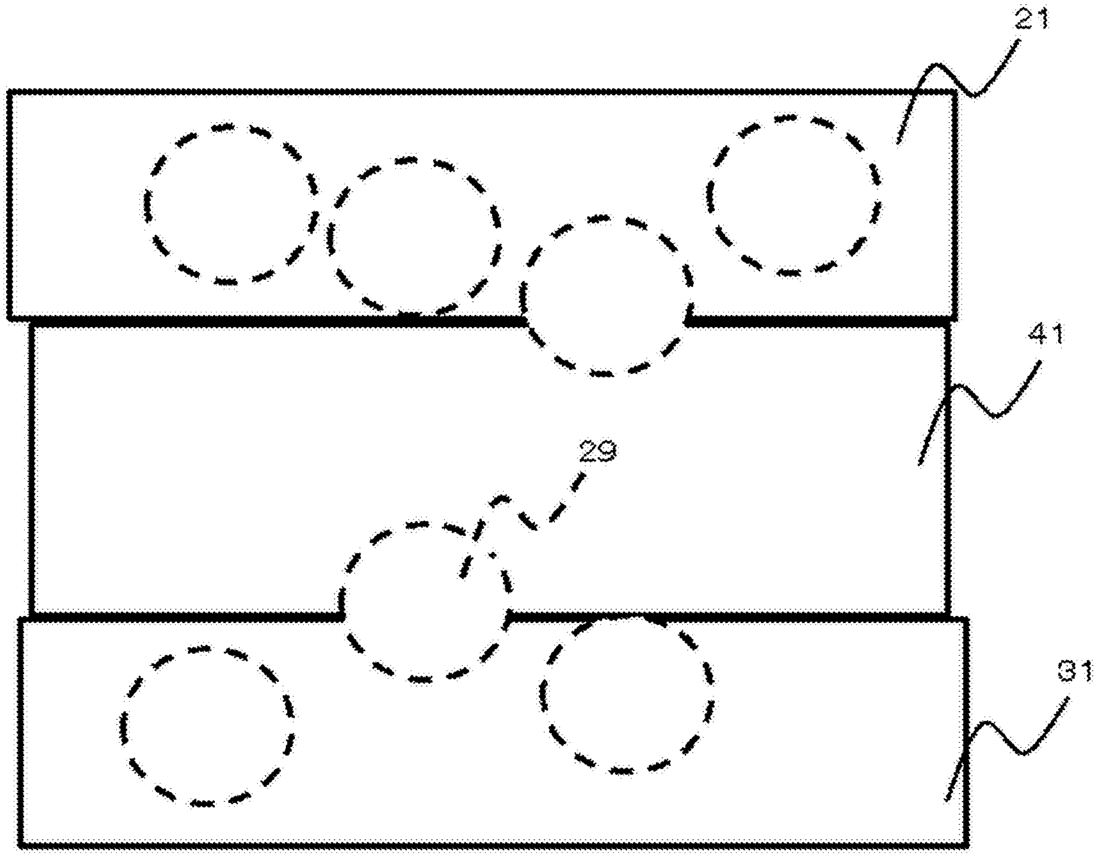
FIG. 24 is a view subsequent to FIG. 23.

After that, as illustrated in FIG. 23, the user takes out the rinse sheet 321 and the support sheet 331.

Then, the user sandwiches the washing target 341 between the rinse sheet 321 and the support sheet 331, and presses the rinse sheet 321 against the washing target 341.

In this way, rinse liquid 29 is oozed from the rinse sheet 321 into the washing target 341, and the liquid detergent 15 trapping the dirt 19 is mixed into the rinse liquid 29.

Next, the rinse liquid 329 in which the liquid detergent 315 trapping the dirt 319 has been mixed is absorbed into the support sheet 331. By repeating this operation, as illustrated in FIG. 8, substantially all the rinse liquid 329 is absorbed into the support sheet 331.

[Portable Detergent Kit]

Figure 25:
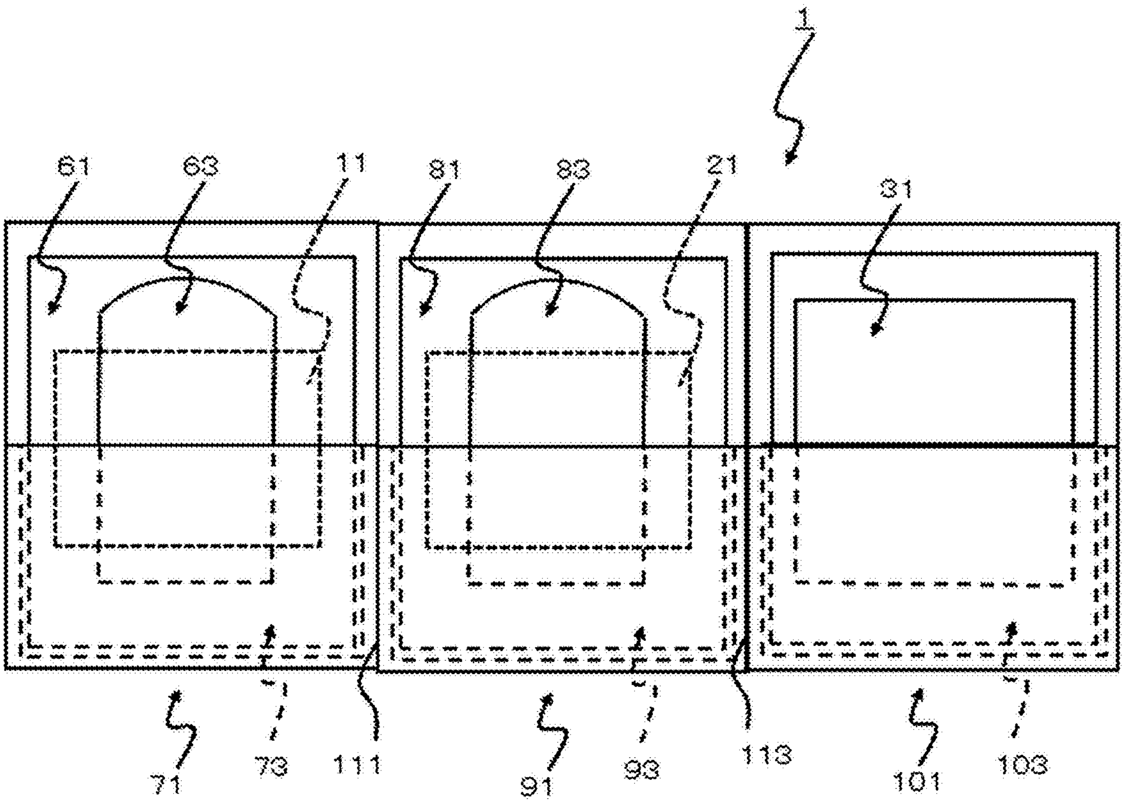
FIG. 25 is a front view illustrating a state in which a detergent kit illustrated in FIG. 17 is developed.

FIG. 25 is a front view illustrating a state in which a detergent kit 301 according to the third embodiment of the present invention is developed.

As illustrated in FIG. 25, the detergent kit 301 in the developed state is rectangular.

In the detergent kit 301, for example, a detergent-sheet housing portion 371, a rinse-sheet housing portion 391, and a support-sheet housing portion 401 each having a sheet-like shape are arranged in the stated order.

A folding portion 4111 is located between the detergent-sheet housing portion 371 and the rinse-sheet housing portion 391. In addition, another folding portion 413 is located between the rinse-sheet housing portion 391 and the support-sheet housing portion 401.

A part of a detergent-sheet packet 361 is housed in a detergent-sheet pocket 373 of the detergent-sheet housing portion 371.

Figure 27:
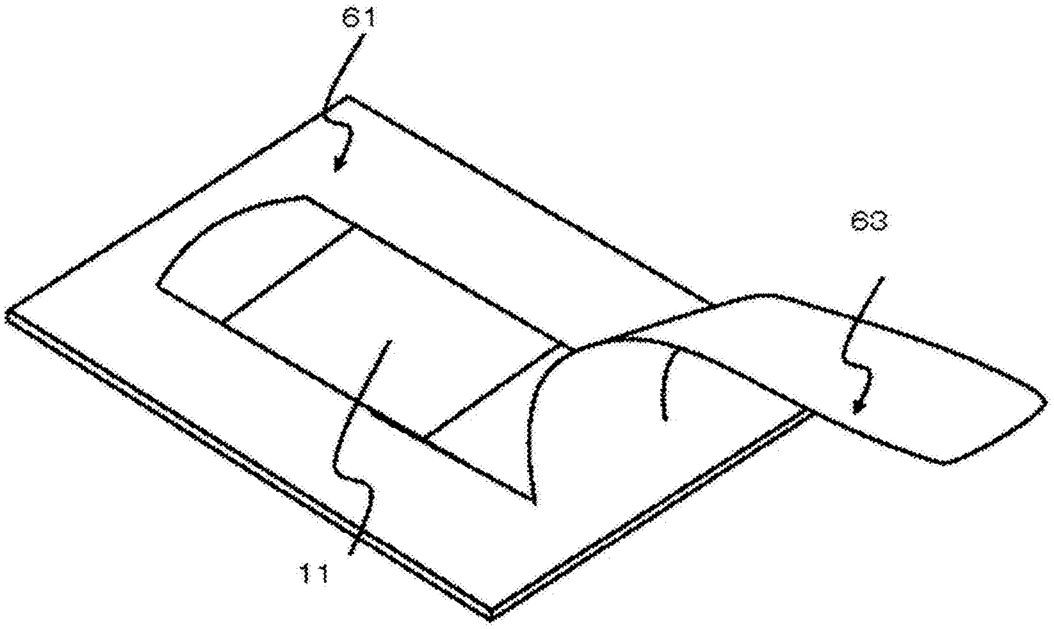
FIG. 27 is an explanatory view illustrating a state in which, by pinching and moving downward a part of a detergent-sheet packet with fingers, the detergent-sheet packet is unsealed to form an opening portion, whereby the detergent kit packed therein is exposed.

The detergent-sheet packet 361 is made of a waterproof material. As illustrated in FIG. 27, by pinching and moving downward a part 363 with fingers, the detergent-sheet packet 361 is unsealed to form an opening portion, whereby the detergent sheet 311 packed therein is exposed.

With such a configuration, the user can press the detergent sheet 311 against the washing target 341 without directly touching the detergent sheet 311 with his/her fingers.

A part of a rinse-sheet packet 381 is housed in a rinse-sheet pocket 393 of the rinse-sheet housing portion 391.

The rinse-sheet packet 381 is made of a waterproof material. By pinching and moving downward a part 383 with the fingers, the rinse-sheet packet 381 is unsealed to form an opening portion, whereby the rinse sheet 321 packed therein is exposed.

With such a configuration, the user can press the rinse sheet 321 against the washing target 341 without directly touching the rinse sheet 321 with his/her fingers.

A part of the support sheet 331 is housed in a support-sheet pocket 403 of the support-sheet housing portion 401.

Figure 26:
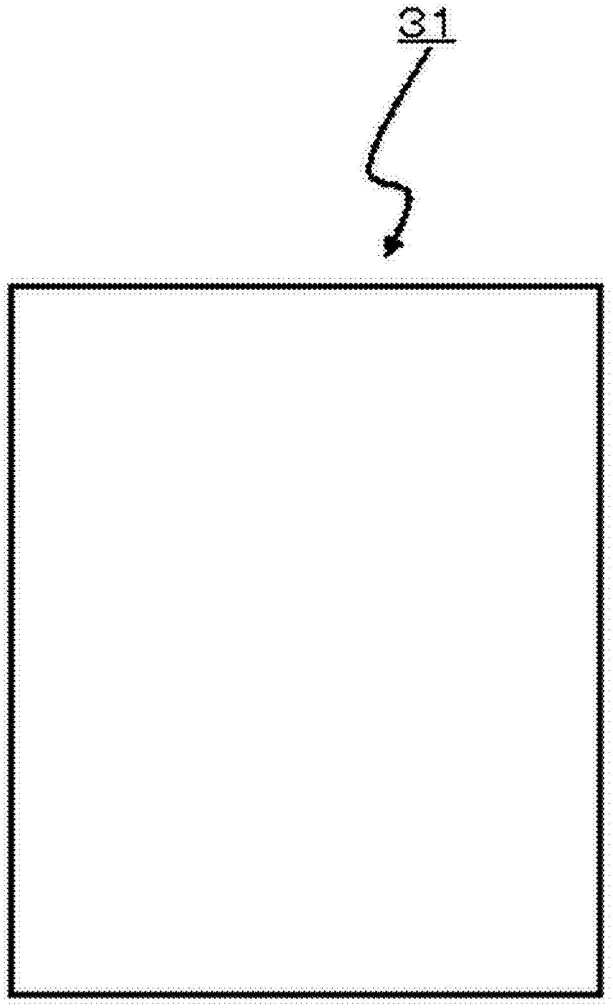
FIG. 26 is a front view illustrating a state in which the detergent kit illustrated in FIG. 25 is folded.

The detergent kit 301 can be folded as illustrated in FIG. 26, for example, by being folded at the folding portion 413 illustrated in FIG. 25 so that the support-sheet housing portion 401 is superimposed on the rinse-sheet pocket 393, and then by being folded at the folding portion 411 so that the detergent-sheet housing portion 371 is superimposed on the support-sheet housing portion 401. Thus, the detergent kit 301 is convenient to carry.

Specifically, according to this embodiment, the detergent kit 301 can be folded into a portable size, and hence, dirt can be easily cleaned off even out of home by carrying the detergent kit 301.

In addition, the detergent kit 301 allows use of not only the detergent sheet 311 but also the rinse sheet 321, and hence high cleaning effect can be exerted.

Although the detergent sheet 311, the rinse sheet 321, and the support sheet 331 exemplified above in this embodiment are each have the rectangular sheet-like shape, their shapes may be changed as appropriate.

In addition, although the detergent kit 301 in the case exemplified above includes the detergent-sheet housing portion 371, the rinse-sheet housing portion 391, and the support-sheet housing portion 401, the detergent kit 301 may include only the detergent-sheet housing portion 371 and the rinse-sheet housing portion 391.

INDUSTRIAL APPLICABILITY

The present invention is applicable to detergent and washing business.

The invention claimed is:

1. A portable washing kit, comprising:

a holder formed of a single holder sheet divided by a folding portion into adjacent holder-sheet portions;

a detergent-means holding portion formed in the holder sheet and holding a detergent means containing a liquid cleaner;

a rinse-means holding portion formed in the holder sheet and holding a rinse means containing a rinse liquid; and a support-means holding portion formed in the holder sheet and holding a water-absorbing support means to be used for sandwiching, after the liquid cleaner is applied to a spot on a washing target that has dirt on the spot, the washing target between the water-absorbing support means and the rinse means at a time when the rinse means is pressed against the dirt spot.

2. The portable washing kit according to claim 1, wherein in a closed state, the holder is folded at the folding portion so that entireties of the detergent means, the rinse means, and the water-absorbing support means are prevented from being exposed to an outside, and so that the holder-sheet portions on both sides of the folding portion are superimposed on each other.

3. The portable washing kit according to claim 1, wherein the detergent-means holding portion, the rinse-means holding portion, and the support-means holding portion are formed as a single holding portion formed in the holder sheet, and the detergent means, the rinse means, and the water-absorbing support means are held in the single holding portion while being superimposed on each other in an order of the water-absorbing support means, the rinse means, and the detergent means from a depth side toward a near side.

4. The portable washing kit according to claim 2, wherein the folding portion includes two folding portions, the single holder sheet of the holder is folded in three by being divided by the two folding portions into a first holder-sheet portion, a second holder-sheet portion, and a third holder-sheet portion arranged in sequential order, the detergent-means holding portion, the rinse-means holding portion, and the support-means holding portion are respectively provided as slits in the first holder-sheet portion, in the closed state, parts of the detergent means, the rinse means, and the water-absorbing support means are located at positions sandwiched between the first holder-sheet portion and the second holder-sheet portion, and in the closed state, other parts of the detergent means, the rinse means, and the water-absorbing support means are located at positions sandwiched between the first holder-sheet portion and the third holder-sheet portion.

5. The portable washing kit according to claim 4, wherein in the first holder-sheet portion, the detergent-means holding portion, the rinse-means holding portion, and the support-means holding portion are provided in sequential order.

6. The portable washing kit according to claim 5, wherein the water-absorbing support means is held in the support-means holding portion so that the water-absorbing support means and the rinse means held in the rinse-means holding portion partially overlap with each other, and so that the water-absorbing support means is located before the rinse means.

7. The portable washing kit according to claim 3, wherein the folding portion includes two folding portions, the single holder sheet of the holder is folded in three by being divided by the two folding portions into a first holder-sheet portion, a second holder-sheet portion, and a third holder-sheet portion, arranged in sequential order, the single holding portion is a slit which is formed in the first holder-sheet portion and in which the detergent means, the rinse means, and the water-absorbing support means are inserted, in the closed state, parts of the detergent means, the rinse means, and the water-absorbing support means are located at positions sandwiched between the first holder-sheet portion and the second holder-sheet portion, and in the closed state, other parts of the detergent means, the rinse means, and the water-absorbing support means are located at positions sandwiched between the second holder-sheet portion and the third holder-sheet portion.

8. The portable washing kit according to claim 1, wherein the detergent means is an elongated waterproof packet holding a cotton swab impregnated with the liquid cleaner, the rinse means is a water-absorbing sheet impregnated with the rinse liquid, and the water-absorbing support means is another water-absorbing sheet.

9. The portable washing kit according to claim 1, wherein the liquid cleaner contains a bleaching detergent composition containing an organic peracid precursor that reacts with hydrogen peroxide in water to produce an organic peracid having an alkyl group with 7 to 19 carbon atoms, and a hydrogen-peroxide releaser, a proteolytic enzyme, sodium bicarbonate, and water, the rinse liquid contains preservative containing at least one of benzazirconium chloride and citric acid, and water, the detergent means and the rinse means are each made of cotton, and the water-absorbing support means is made of pulp.

10. The portable detergent kit according to claim 1, wherein the detergent means includes grooved cotton-wad portions each including a cotton material having a weight of 0.34 g to 0.345 g, and an impregnation amount of the liquid cleaner is 0.1 g to 0.14 g.

11. A washing method using the portable washing kit of claim 1, comprising:

a first step of pressing the detergent means against a washing target; and a second step of pressing, after the first step, the rinse means against the washing target, the second step being carried out while sandwiching the washing target between the rinse means and the water-absorbing support means.

12. A portable detergent kit, comprising:

a detergent-sheet housing portion housing a detergent sheet;

a rinse-sheet housing portion housing a rinse sheet; and a support-sheet housing portion housing a support sheet to be used for sandwiching a washing target between the support sheet and the detergent sheet or the rinse sheet at a time when the detergent sheet or the rinse sheet is pressed against a spot on the washing target that has got dirt on the spot, the detergent sheet being made of a water-absorbing material, and impregnated with liquid detergent, the liquid detergent containing a bleaching detergent composition containing an organic peracid precursor that reacts with hydrogen peroxide in water to produce an organic peracid having an alkyl group with 7 to 19 carbon atoms, and a hydrogen-peroxide releaser, a proteolytic enzyme, sodium bicarbonate, and water, the rinse sheet being made of a water-absorbing material, and impregnated with rinse liquid, the rinse liquid containing preservative containing at least one of benzalkonium chloride and citric acid, and water, wherein the portable detergent kit is folded by being folded at a folding portion located between the detergent-sheet housing portion and the rinse-sheet housing portion so that the detergent-sheet housing portion and the rinse-sheet housing portion are superimposed on each other, and by being folded at another folding portion located between the rinse-sheet housing portion and the support-sheet housing portion so that the rinse-sheet housing portion and the support-sheet housing portion are superimposed on each other.

13. A washing method that is implemented by using the portable detergent kit according to claim 12, the washing method comprising:

a first step of pressing the detergent sheet against a washing target; and a second step of pressing, after the first step, the rinse sheet against the washing target while sandwiching the washing target between the rinse sheet and the support sheet.

14. A portable detergent kit, comprising:

a detergent-sheet housing portion housing a detergent sheet;

a rinse-sheet housing portion housing a rinse sheet; and a support-sheet housing portion housing a support sheet to be used for sandwiching a washing target between the support sheet and the detergent sheet or the rinse sheet at a time when the detergent sheet or the rinse sheet is pressed against a spot on the washing target that has got dirt on the spot, the detergent sheet being made of a water-absorbing material, and impregnated with liquid detergent, the rinse sheet being made of a water-absorbing material, and impregnated with rinse liquid, wherein the portable detergent kit is folded by being folded at a folding portion located between the detergent-sheet housing portion and the rinse-sheet housing portion so that the detergent-sheet housing portion and the rinse-sheet housing portion are superimposed on each other, and by being folded at another folding portion located between the rinse-sheet housing portion and the support-sheet housing portion so that the rinse-sheet housing portion and the support-sheet housing portion are superimposed on each other.

* * * * *